(12) United States Patent
Suzuki et al.

(10) Patent No.: US 7,684,152 B2
(45) Date of Patent: Mar. 23, 2010

(54) METHOD OF MITIGATING ECCENTRICITY IN A DISK DRIVE WITH DTR MEDIA

(75) Inventors: Shoji Suzuki, San Jose, CA (US); Wen Jiang, Fremont, CA (US)

(73) Assignee: WD Media, Inc., San Jose, CA (US)

( * ) Notice: Subject to any disclaimer, the term of this patent is extended or adjusted under 35 U.S.C. 154(b) by 1443 days.

(21) Appl. No.: 10/949,459

(22) Filed: Sep. 24, 2004

(65) Prior Publication Data

US 2006/0066994 A1 Mar. 30, 2006

(51) Int. Cl.
*G11B 5/82* (2006.01)
(52) U.S. Cl. .................. 360/135; 360/98.08; 360/99.08; 360/99.12
(58) Field of Classification Search ............... 360/99.08, 360/99.12; 720/701, 717
See application file for complete search history.

(56) References Cited

U.S. PATENT DOCUMENTS

| | | | | |
|---|---|---|---|---|
| 3,655,441 | A | * | 4/1972 | Kefalas ....................... 360/134 |
| 5,297,131 | A | * | 3/1994 | Tanaka ..................... 369/275.2 |
| 5,585,989 | A | * | 12/1996 | Kuromiya et al. ........... 360/135 |
| 5,723,033 | A | * | 3/1998 | Weiss ..................... 204/192.15 |
| 5,774,313 | A | | 6/1998 | Tanaka et al. |
| 5,882,122 | A | * | 3/1999 | Noguchi et al. ............. 384/490 |
| 5,903,540 | A | * | 5/1999 | Ro et al. ..................... 720/698 |
| 5,907,448 | A | | 5/1999 | Watanabe et al. |
| 5,949,605 | A | | 9/1999 | Lee et al. |
| 6,081,990 | A | * | 7/2000 | Kuroba et al. ............. 29/603.01 |
| 6,139,936 | A | * | 10/2000 | Weiss ......................... 428/141 |

(Continued)

FOREIGN PATENT DOCUMENTS

JP 06342578 A * 12/1994

(Continued)

OTHER PUBLICATIONS

Kenjiro Watanabe, Toru Takeda, Kanzo Okada, Hiroshi Takino, Demonstration of Track Following Technique Based on Discrete Track Media, IEEE Transactions on Magnetics, vol. 29, No. 5, Nov. 1993, pp. 4030-4032.

(Continued)

*Primary Examiner*—Joseph H Feild
*Assistant Examiner*—Carlos E. Garcia
(74) *Attorney, Agent, or Firm*—Blakely, Sokoloff, Taylor & Zafman LLP

(57) ABSTRACT

A disk drive with DTR media and method of assembly is described. The method may include aligning a discrete track recording (DTR) track pattern center on a DTR disk with a rotational center of a spindle hub and mounting the DTR disk on the spindle hub to minimize eccentricity. After the DTR disk is mounted to the spindle hub, it may be rotated to a designed rotational speed and the mass imbalance of the rotating DTR disk/spindle hub may be measured. The mass imbalance may be mitigated using a mechanical component such as a counter weight coupled to a spindle rotatable component, for example, the spindle hub, a spacer assembly, a clamp assembly, etc. The method may mitigate the eccentricity associated with DTR media and minimize run-out due to the mass imbalance of an otherwise rotated DTR disk/hub aligned for eccentricity correction.

9 Claims, 5 Drawing Sheets

U.S. PATENT DOCUMENTS

| | | | |
|---|---|---|---|
| 6,314,077 B1 | 11/2001 | Shishido et al. | |
| 6,504,674 B2 | 1/2003 | Yoshida et al. | |
| 6,594,109 B2 | 7/2003 | Renken | |
| 6,654,198 B2 | 11/2003 | Liu et al. | |
| 6,698,286 B1* | 3/2004 | Little et al. | 73/469 |
| 6,757,116 B1* | 6/2004 | Curtiss et al. | 360/15 |
| 6,778,353 B1 | 8/2004 | Harper | |
| 6,785,073 B2 | 8/2004 | Min et al. | |
| 6,940,678 B2* | 9/2005 | Kuo et al. | 360/77.03 |
| 7,275,302 B2* | 10/2007 | Ng | 29/603.03 |
| 2003/0063412 A1* | 4/2003 | Jierapipatanakul et al. | 360/99.08 |
| 2003/0112552 A1* | 6/2003 | Choo et al. | 360/99.12 |
| 2003/0142436 A1* | 7/2003 | Kawaguchi et al. | 360/75 |
| 2004/0174636 A1* | 9/2004 | Suzuki et al. | 360/135 |
| 2005/0036223 A1* | 2/2005 | Wachenschwanz et al. | 360/48 |
| 2005/0158163 A1* | 7/2005 | Harper et al. | 414/788.1 |

FOREIGN PATENT DOCUMENTS

| | | |
|---|---|---|
| JP | 11353788 A * | 12/1999 |
| JP | 2001-034902 | 2/2001 |

OTHER PUBLICATIONS

Ho Seong Lee, Herman Ferrier, "Open-Loop Compensation of Rerpeatable Runouts in Discrete-Track Magnetic Disks", ISPS-vol. 1, Advances in Information Storage and Processing Systems, ASME 1995, pp. 221-226.

* cited by examiner

METHOD OF MITIGATING ECCENTRICITY IN A DISK DRIVE WITH DTR MEDIA

TECHNICAL FIELD

This invention relates to the field of disk drives and, more specifically, to mitigating eccentricity in disk drives with discrete track recording media.

BACKGROUND

A disk drive system includes one or more magnetic recording disks and control mechanisms for storing data within approximately circular tracks on the disk. A disk is composed of a substrate and one or more layers deposited on the substrate (e.g., aluminum). A sheet of the substrate material may be punched or scribed along outer and inner diameter contours to generate the substrate having an inner diameter (ID) and an outer diameter (OD).

A trend in the design of disk drive systems is to increase the recording density of the magnetic recording disk used in the system. One method for increasing recording density is to pattern the surface of the disk with discrete tracks, referred to as discrete track recording (DTR). A DTR pattern may be formed by nano-imprint lithography (NIL) techniques, in which a pre-embossed forming tool (a.k.a., stamper, embosser, etc.), having an inverse pattern to be imprinted, is pressed into an embossable film (i.e., polymer) disposed above a disk substrate to form an initial pattern of compressed areas. This initial pattern ultimately forms a pattern of raised and recessed areas. After stamping the embossable film, an etching process may be used to transfer the pattern through the embossable film by removing the residual film in the compressed areas. After the imprint lithography process, another etching process may be used to form the pattern in a base structure having one or more layers (e.g., substrate, nickel-phosphorous, soft magnetic layer, etc.) residing underneath the embossable film. The resulting DTR track structure contains a pattern of concentric raised areas and recessed areas under a magnetic recording layer. The raised areas (also known as hills, lands, elevations, etc.) are used for storing data and the recessed areas (also known as troughs, valleys, grooves, etc.) that may store servo (head positioning) information and provide inter-track isolation to reduce noise. The servo information may also be interleaved with data in sectors stored on the raised areas.

Nano-imprint lithography processes may inevitably have some degree of eccentricity (e.g., 5 microns) between the DTR pattern center and the disk's geometric center resulting from less than perfect alignment procedures between a stamper and the disk during embossing operations. Such eccentricity may also result in problems with the positioning of a head over the DTR tracks during read and write operations of the disk drive. If the disk is mounted on the spindle hub using conventional assembly processes, the mass center of the disk would be aligned with the rotational center of the spindle without consideration as to the eccentricity of the DTR pattern center.

The basis for conventional assembly processes is that the mass center may be at point A, while the rotational center (substantially the ID geometric center at which the disk rotates when mounted) may be at a different point B, as illustrated in FIG. 1. A disk having this type of misalignment may encounter balancing problems when rotated on the spindle of a disk drive system. In order to ensure proper rotation of a disk on a spindle, conventional assembly processes attempt to locate the mass center of the disk at the rotational center at which the disk rotates. Thus, a mass balanced disk is one in which the mass center of the disk equates to the rotational center of the disk. A mass balanced disk is functionally important, because newer disk drive systems require higher rotational speeds. A high rotational speed of an unbalanced disk may lead to poor performance or disk failure. In addition, proper balancing is also necessary to achieve high track density by enabling the read/write head to accurately follow data tracks on a disk. However, conventional assembly processes do not account for the eccentricity of the DTR pattern center relative to the rotational center of the spindle.

One paper by Ho Seong Lee and Herman Ferrier, entitled "Open-Loop Compensation Of Repeatable Runouts In Discrete-Track Magnetic Disks," ISPS-Vol. 1, ASME, 1995 analyzed run-outs due to DTR pattern eccentricity. This paper discusses experiments where a disk was installed on an adjustable spindle chuck under conditions where a repeatable run-out (RRO) was observed. In order to minimize the observed run-outs, the center of the spindle chuck was visually adjusted through a video monitor to adjust the run-out.

One problem with such an analysis is that it does not address non-repeatable run-out due to the disk's weight imbalance when the disk's mass center does not coincide with the rotational center of the spindle. During disk drive operation, such non-repeatable run-out of the disk results from the spindle vibration excited by the moment of the rotating disk. The predefined DTR track pattern on the disk must be followed by a head in order to read and write on the data tracks. To do so, the head must be moved constantly to compensate for such off-track deviations of the head due to non-repeatable run-out.

U.S. Pat. No. 5,907,448 describes a technique that servo-tracks a head where eccentricity exists between the rotational center of the disk and the DTR tracks' center. A suspension arm that supports the head in the disk drive needs to be moved constantly to follow the DTR tracks to read and write on a particular data track, if the track is not concentric with the rotational center of the disk. The suspension arm is electronically controlled to follow the DTR tracks that are, in effect, moving relative to the rotational path around the center of the disk by a sinusoidal input to a voice coil motor that drives the suspension arm. One problem with such an active, electronic control solution is that it does not minimize the eccentricity of the system when the disk is assembled into the disk drive. Such a solution consumes power even in the track following mode and adds complexity to the servo scheme in order to accommodate the burden of off-track head deviations.

DESCRIPTION OF THE DRAWINGS

The present invention is illustrated by way of example, and not limitation, in the figures of the accompanying drawings in which.

DETAILED DESCRIPTION

In the following description, numerous specific details are set forth such as examples of specific materials or components in order to provide a thorough understanding of the present invention. It will be apparent, however, to one skilled in the art that these specific details need not be employed to practice the invention. In other instances, well known components or methods have not been described in detail in order to avoid unnecessarily obscuring the present invention.

It should be noted that the apparatus and methods discussed herein may be used with various types of disks. In one embodiment, the apparatus and methods discussed herein may be used magnetic recording disks. The magnetic recording disk may be, for example, a DTR longitudinal magnetic recording disk having, for example, a nickel-phosphorous (NiP) plated substrate as a base structure. Alternatively, the magnetic recording disk may be a DTR perpendicular magnetic recording disk having a soft magnetic film disposed above a substrate for the base structure. In an alternative embodiment, the apparatus and methods discussed herein may be used with other types of digital recording disks, for example, an optical recording disk such as a compact disc (CD) and a digital-versatile-disk (DVD). Although the discussed herein may be in reference to a single disk, the invention is not so limited and may be used with multiple disks.

The following discussion will be made, at times, to both a structural relationship between components in a disk drive system in regards to FIGS. 2, 3 and 4, and a method of assembling components in a disk drive system as in regards to FIG. 5.

Figure 1:
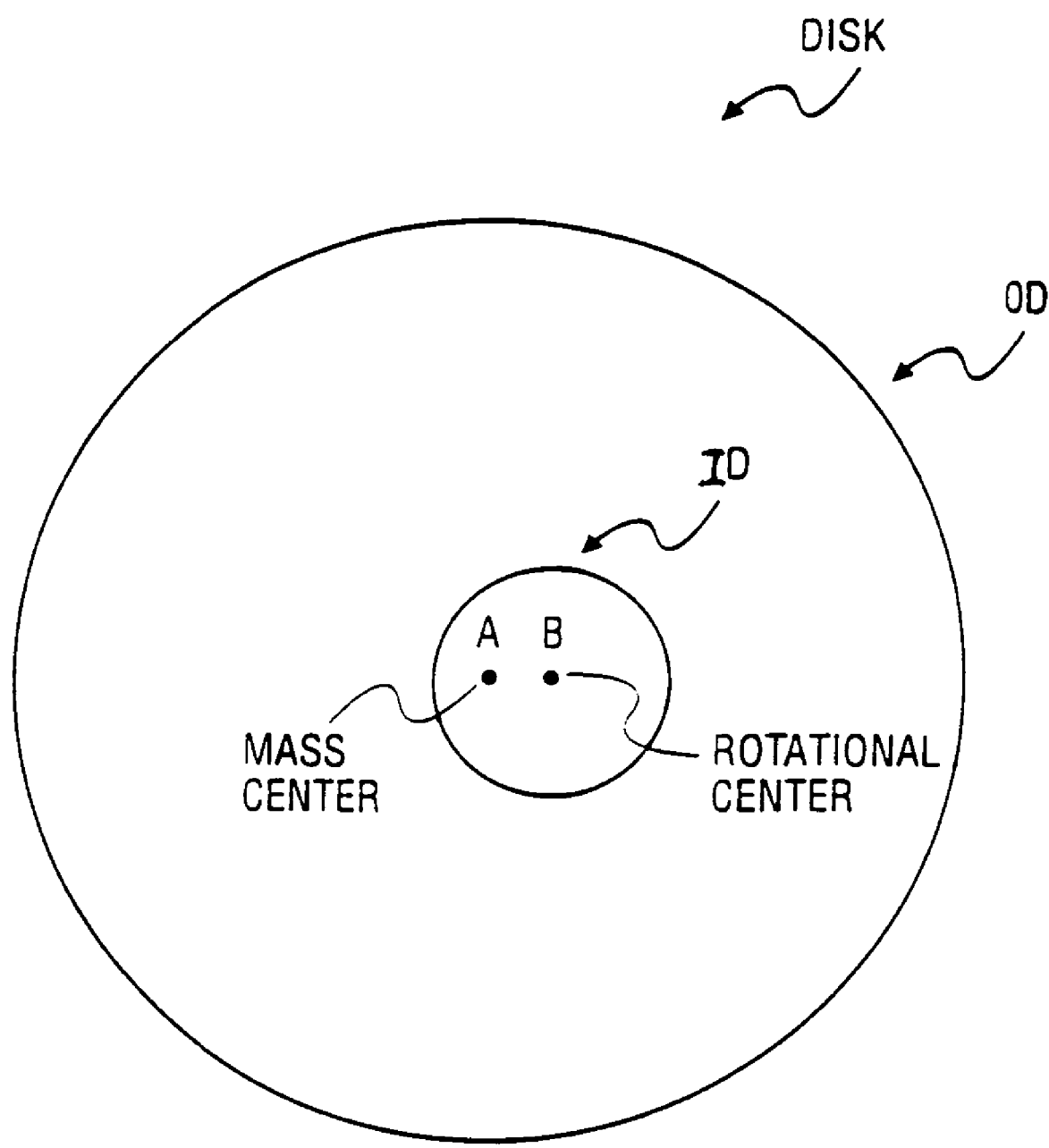
FIG. 1 illustrates a disk having a mass center offset from its rotational center.
Figure 2:
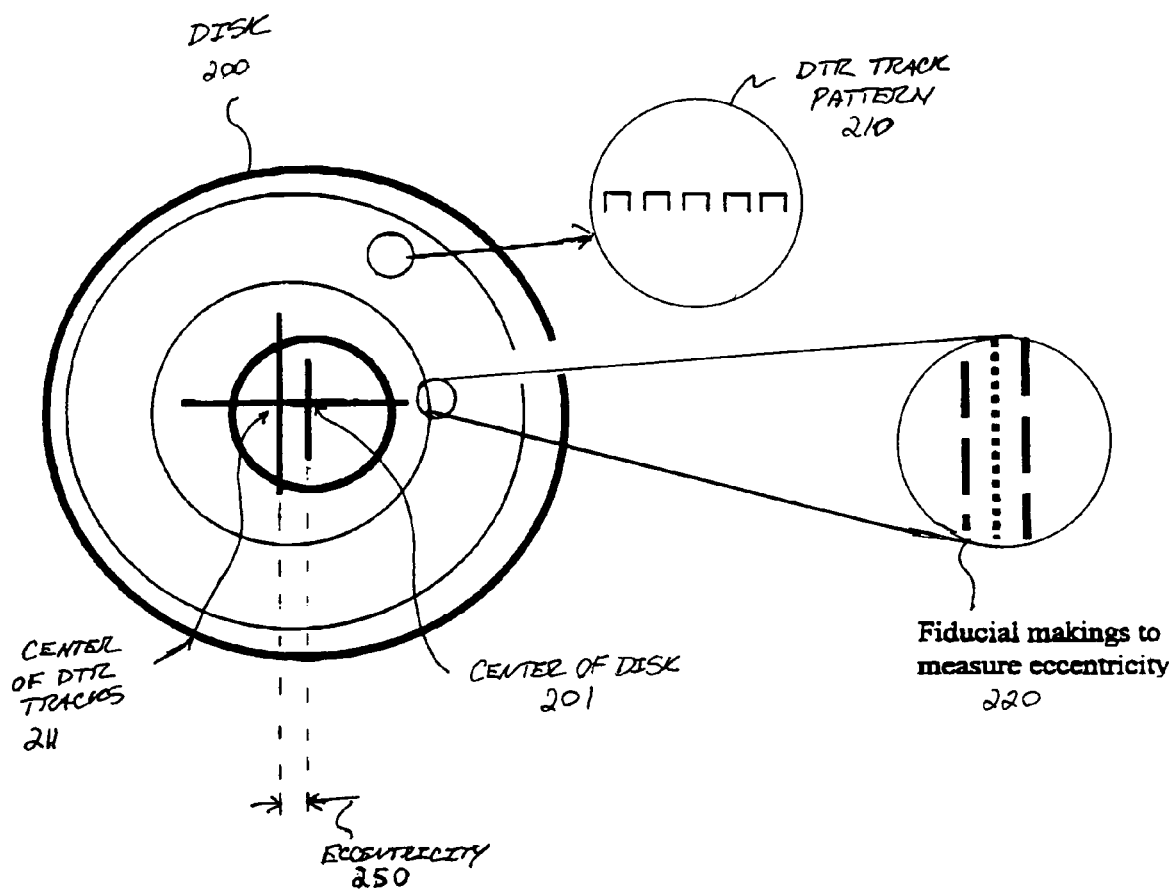
FIG. 2 illustrates one embodiment of disk eccentricity.

FIG. 2 illustrates one embodiment of a DTR disk with eccentricity between its tracks and its center. In this embodiment, disk 200 is a DTR disk having a DTR pattern 210. The imprint lithography processes that may be used to generate DTR pattern 210 may result in some degree of eccentricity 250 (e.g., 5 microns) between the DTR pattern center 211 and the disk's geometric center 201 resulting from the imperfect alignment procedures between a stamper and the disk 200 during embossing operations. Imprint lithography techniques used to generate DTR disks are known in the art; accordingly, a detailed discussion is not provided herein.

Such eccentricity 250 may result in problems with the positioning of a disk drive head over a track of DTR pattern 210 during read and write operations of the disk drive. If disk 200 is mounted on a spindle hub using conventional assembly processes, the mass center of disk 200 is aligned with the rotational center of the spindle without consideration as to the eccentricity 250 of the DTR pattern center 211. In order to correct for eccentricity 250, the center of the DTR tracks 211 is substantially aligned (step 510 of FIG. 5) with the disk drive spindle hub center 331 illustrated in FIG. 3.

Figure 3:
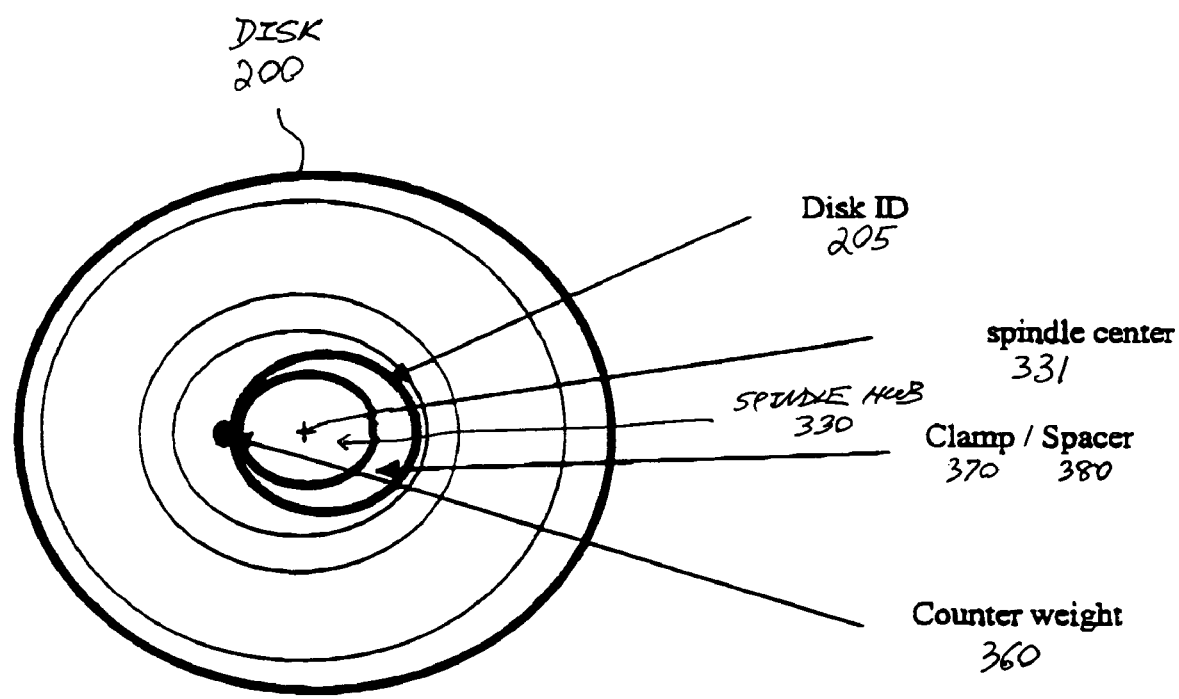
FIG. 3 illustrates one embodiment of a DTR disk alignment with a spindle hub.

FIG. 3 illustrates one embodiment of a DTR disk having a DTR track center aligned with a spindle hub center. The center of the DTR tracks 211 may be aligned with the disk drive spindle hub center 331, for example, by optical or visual inspection of one or more fiducial markers 220, as illustrated in FIG. 2, that have a known, predetermined relationship to the center of the DTR tracks 211. In one embodiment, a fiducial marker may be generated with the same stamper that is used to generate the DTR track pattern 210. Alternatively, a fiducial marker 220 may be generated with another stamper or by other means known in the art. By detecting one or more fiducial markers 220 having a known position relative to the center 201 of disk 200, a corresponding adjustment of disk 200 relative to spindle hub 330, prior to securing disk 200 to the spindle hub 330, may be performed to align the center of the DTR tracks 211 with the spindle hub center 331. It should be noted that the fiducial markings shown in FIG. 2 are only for illustrative purpose and is not meant to limit the markings to any particular shape, size, position on disk 220, etc.

The alignment of the DTR track center 211 with the center 331 of the spindle hub 330, however, may result in an imbalance to the disk/hub when it is rotated in operation of the disk drive. Proper balancing of disk 200 is important for proper operation of the disk 200 in the disk drive system. The mass balance point on disk 200 may not be the same as the DTR track center 211 (or even the rotational center 210 of the disk 200) and, thereby, imbalance disk 200 when rotated on spindle hub 330.

Therefore, after alignment (step 510 of FIG. 5) of DTR track center 211 with spindle hub center 331, the mass imbalance of component weight distribution around the spindle hub 330 during rotation is mitigated. In one embodiment, after disk 200 is mounted on spindle hub 330, it is rotated (step 520 of FIG. 5) to a desired rotational speed (e.g., the speed at which the disk/hub is designed to be rotated during read and write operations of the particular disk drive being assembled) and then the mass imbalance is determined (step 530 of FIG. 5) by monitoring the spindle vibration. Based on the degree of the vibration, the mass imbalance may be mitigated (step 540 of FIG. 5) by coupling one or more mechanical components with one or more spindle rotated components. Alternatively, the OD position of the disk may be measured in order to determine the mass center of the disk without need for rotation.

In order to mitigate the determined mass imbalance, in one embodiment, one or more counter weights (e.g., counter weight 360) may be coupled with the spindle hub 330. Alternatively, one or more counter weights may be coupled to other components/places in the disk drive, for example, a clamp assembly 370 used to secure disk 200 to the spindle and/or a spacer assembly 380 used to separate disk 200 from other disks to provide room for head movement there between. The counter weight may also be referred to by other terms, for example, a balancer or balance ring. The counter weight may be incorporated into an existing component within an assembly, for example, one or more screws used in a clamp assembly may be constructed with a different weights relative to other screws.

In an alternative embodiment, the mitigation of the mass imbalance of DTR disk 200 rotating on a spindle hub 330 may utilize ID balance ring (different than a balance ring in a clamp assembly disposed on the outer surfaces of a disk rather than within a disk's ID edge) of the disk 200 and trimming procedure, for example, similar to that discussed in U.S. Pat. No. 6,778,353. An ID balance ring could be used by itself or in conjunction with a counter weight to mitigate mass imbalance contributions from the spindle hub 330 to the rotating system.

Figure 4:
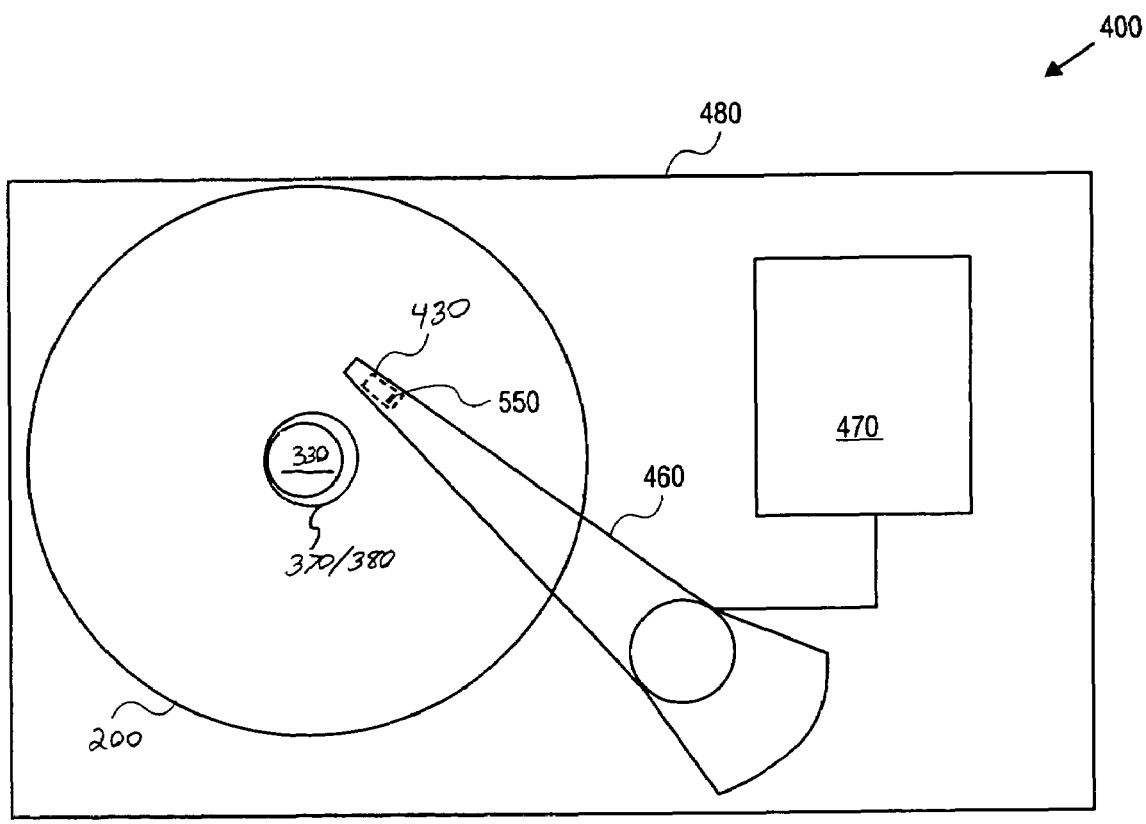
FIG. 4 illustrates a DTR disk assembled into a disk drive according to one embodiment of the present invention.
Figure 5:
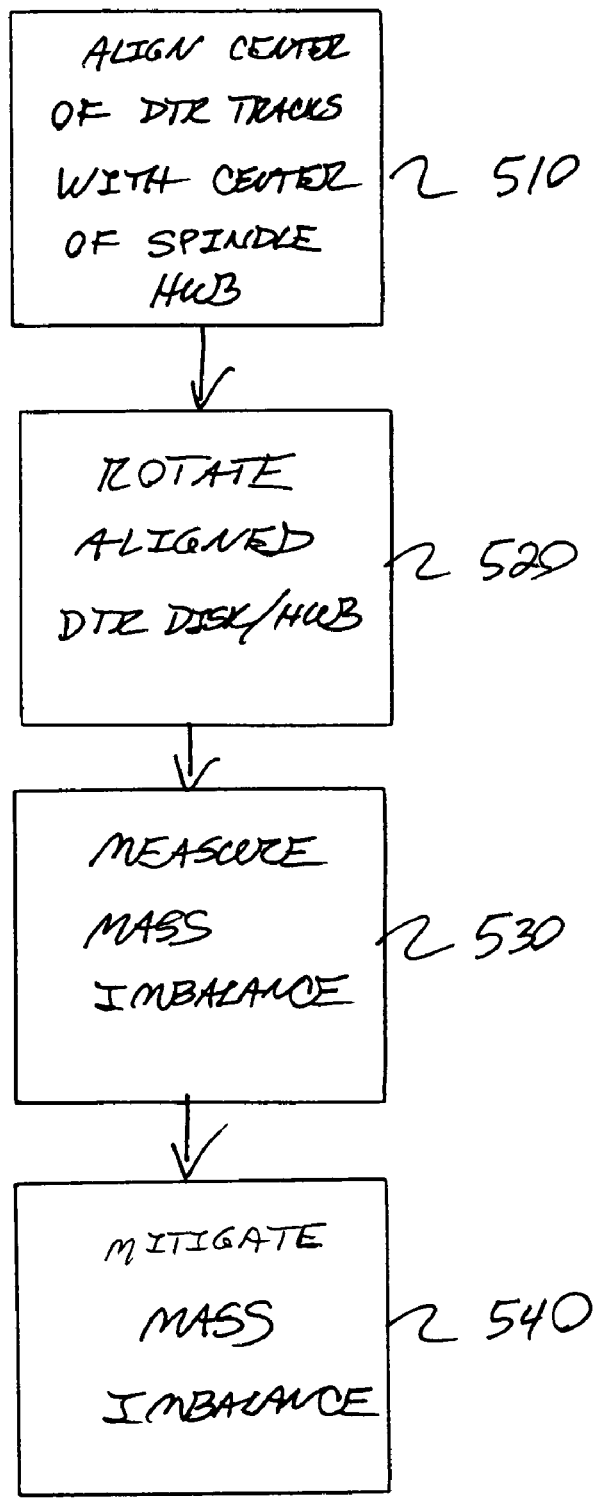
FIG. 5 illustrates one embodiment of a method of assembling components in a disk drive.

FIG. 4 illustrates one embodiment of a disk drive having a disk track pattern aligned with a spindle hub's rotation center and mass balanced with the spindle hub. Disk drive 400 may include one or more disks 200 to store data along tracks in a magnetic recording layer of disk 200. Disk 200 is coupled to a spindle hub 330 of a spindle assembly mounted in drive housing 480. A spindle motor (not shown) rotates spindle hub 330 and, thereby, disk 200 to position a head 550 on slider 430 at a particular location along a desired disk track. The position of head 550 relative to a track of DTR track pattern 210 of disk 200 may be controlled by position control circuitry 470.

The slider body 430 is attached to a suspension 460 via a gimbal assembly that load biases the slider body 430 towards the disk 200. The net effect of the air bearing surface of slider 430 and the suspension 460 is to cause the slider 430 to fly at a desired height above disk 200 when the disk is rotating. Although illustrated with only a single disk and a single side for ease of discussion, disk drive 400 may include double side disks and multiple (single sided and/or double sided) disks in which each side of a disk may have a corresponding slider and suspension arm assembly.

The reading and writing of data is accomplished with head 550 of slider 430. Head 550 includes both read and write elements. The write element is used to alter the properties of the longitudinal or perpendicular magnetic recording layer of disk 200. In one embodiment, head 550 may have a magneto-resistive (MR) and, in particular, a giant magneto-resistive (GMR) read element and an inductive write element. In an alternative embodiment, head 550 may be another type of head, for example, a Hall effect head or an inductive head having a common element for both read and write operations.

Disk drive 400 also includes a mechanical component as discussed above in relation to FIGS. 2 and 3 to mitigate repeatable and non-repeatable run-out of the head 550 with respect to the tracks on DTR disk 200 that may otherwise cause by a mass imbalance in the spindle rotated components in the disk drive system 400. As discussed above, the mechanical component may reside on one or more of various spindle rotatable components/places of disk drive 400, for example, spindle hub 330, clamp assembly 370 and/or spacer assembly 380. Such mass imbalance in component weight distribution around the spindle hub 330 may be mitigated to minimize the repeatable and non-repeatable run-out in the disk drive 400 and, thereby, reduce the burden on the disk drive system to servo-track head 550 by an active control system that would continuously moves suspension arm 460.

In the foregoing specification, the invention has been described with reference to specific exemplary embodiments thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A method, comprising:
    providing a discrete track recording (DTR) disk for a magnetic recording disk drive having a spindle hub, wherein the DTR disk is a magnetic recording disk;
    substantially aligning a DTR track pattern center on the DTR disk with a rotational center of a spindle hub, wherein DTR track pattern center on the DTR disk is aligned with the rotational center of a spindle hub using fiducial markings on the DTR disk; and
    mitigating a mass imbalance of the DTR disk rotating on the spindle hub using a mechanical component.

2. The method of claim 1, further comprising:
    mounting the DTR disk on the spindle hub; and
    rotating the DTR disk on the spindle hub, wherein mitigating the mass imbalance comprises mass balancing the DTR disk rotating on the spindle hub.

3. The method of claim 2, wherein mass balancing comprises:
    rotating the DTR disk to a rotational speed;
    measuring the mass imbalance of the rotating DTR disk on the spindle hub; and
    coupling the mechanical component to the spindle hub to mitigate the mass imbalance.

4. The method of claim 3, wherein the mechanical component comprises a counter weight.

5. The method of claim 3, wherein the mass imbalance is measured by monitoring a spindle vibration.

6. The method of claim 4, wherein the counter weight has a value and is attached to the spindle hub at a position based on the spindle vibration of the rotating DTR disk on the spindle hub.

7. The method of claim 1, further comprising reducing non-repeatable run-out of the DTR disk due to spindle vibration excited by a moment of the rotating DTR disk.

8. The method of claim 1, wherein the mechanical component comprises a counter weight and wherein the counter weight has a value and is coupled at a position in the disk drive based on a spindle vibration of the rotating DTR disk on the spindle hub.

9. A method, comprising:
    providing a discrete track recording (DTR) disk for a disk drive having a spindle hub;
    substantially aligning a DTR track pattern center on the DTR disk with a rotational center of a spindle hub, wherein the DTR track pattern center on the DTR disk is aligned with the rotational center of a spindle hub using fiducial markings on the DTR disk;
    mounting the DTR disk on the spindle hub;
    rotating the DTR disk on the spindle hub; and
    mitigating a mass imbalance of the DTR disk rotating on the spindle hub using a mechanical component, wherein mitigating the mass imbalance comprises mass balancing the DTR disk rotating on the spindle hub.

* * * * *